United States Patent [19]
Mohr

[11] 3,938,654
[45] Feb. 17, 1976

[54] METHOD AND MACHINE FOR CONVEYING AND ALIGNING ROD-SHAPED FASTENERS

[75] Inventor: Johannes Mohr, Oberboihingen, Germany

[73] Assignee: Karl M. Reich Maschinenfabrik, Nuertingen, Germany

[22] Filed: Mar. 27, 1972

[21] Appl. No.: 238,635

[30] Foreign Application Priority Data
Apr. 2, 1971 Germany............................ 2116269

[52] U.S. Cl. .................... 198/287; 198/37; 221/159
[51] Int. Cl.² ......................................... B65G 47/14
[58] Field of Search ........... 198/37, 39, 41, 68, 252, 198/253, 256, 273, 287; 221/159, 160, 162, 165

[56] References Cited
UNITED STATES PATENTS

| | | | |
|---|---|---|---|
| 662,476 | 4/1899 | Hubbell | 221/165 |
| 1,824,403 | 9/1931 | McKee | 198/41 |
| 2,649,214 | 8/1953 | Kirby et al. | 221/160 |
| 2,670,835 | 3/1954 | Huttmann | 198/37 |
| 2,729,833 | 1/1956 | Nielsen | 221/159 |
| 2,764,351 | 9/1956 | Broscomb et al. | 198/256 |
| 2,832,457 | 4/1958 | Randles | 198/287 |
| 2,854,730 | 10/1958 | Ingham, Jr. | 221/165 |
| 3,067,852 | 12/1962 | Barr | 221/159 |
| 3,478,723 | 11/1969 | Berg | 198/68 |
| 3,578,094 | 5/1971 | Henry et al. | 198/39 |
| 3,731,787 | 5/1973 | Gregor | 198/37 |

*Primary Examiner*—Evon C. Blunk
*Assistant Examiner*—Joseph E. Valenza

[57] ABSTRACT

A method and machine for conveying rod-shaped fasteners from a container holding a supply of unaligned fasteners into alignment with each other and then to a fastener treating mechanism having a high working capacity in which the conveying and aligning means are operatively associated with each other so as to convey at all times an adequate supply of fasteners to the fastener treating mechanism which insures that the full working capacity of the latter will be utilized.

8 Claims, 20 Drawing Figures

METHOD AND MACHINE FOR CONVEYING AND ALIGNING ROD-SHAPED FASTENERS

The present invention relates to a method of conveying and aligning rod-shaped fasteners such as nails, screws or the like, in which the fasteners are conveyed one after the other by several conveying mechanisms so as to travel in the form of a continuous current along guide means.

Methods of this kind are always required when fasteners, for example, nails, screws or the like, which have been dumped loosely into a container are to be fed to a mechanism, for example, for driving nails into workpieces, for packing nails, or for connecting nails in a row so as to form nail strips.

It is an object of the present invention to provide a method of the kind as mentioned above which permits a considerably larger number of fasteners to be supplied for subsequent use than could be supplied by the methods as were previously known.

Another object of the invention is to provide a method in which the fasteners will be conveyed by all of the conveying means with a conveying capacity which is at least as high as the output which may be attained by a fastener utilizing mechanism at the end of the current of fasteners which is conveyed thereto, for example, by one of the fastener utilizing mechanisms as mentioned above. The method according to the invention therefore permits the highest possible output of the particular fastener utilizing mechanism to which the current of fasteners is supplied to be fully attained and this mechanism therefore to be utilized as fully and economically as possible.

A further object of the invention is to provide a method in which for preventing the fasteners from excessively accumulating or piling up against each other during their travel or from being unintentionally stopped at some point of their course of travel, while at other points their conveying means may run idle, the conveying output of one conveying mechanism of the machine is to be controlled in response to and dependent upon the conveying or working output of a following conveying or fastener utilizing mechanism.

A further object of the invention is to provide a method in which for preventing an excessive accumulation of fasteners at some point of their travel through the machine, the excessive fasteners will be removed from this point and be returned to a preceding point so that all of the conveying mechanisms may at all times operate at their full capacity and will be supplied at such a speed to the mechanism at the end of the conveying machine that this mechanism may operate at its full capacity to utilize the fasteners for a particular purpose.

It is a further object of the invention to provide a machine for conveying rod-shaped fasteners, for example, nails, screws or the like, in proper alignment, in a proper useful condition and at a considerably higher speed than was previously attainable in similar machines to a point or mechanism where these fasteners may be utilized for a particular purpose, for example, for connecting them to each other so as to form nail strips. While such mechanisms may often work so as to produce a very high output, the conveying machines which were known prior to this invention usually could not supply the fasteners to such a mechanism at the desired speed so as to utilize its full capacity. Thus, for example, while one of the known machines could deliver only about 300 properly assorted nails per minute in a row, the machine according to the invention is capable of delivering about 2000 nails, for example, to a nail-strip forming mechanism which is capable of connecting them at the same or lower speed to each other.

This object of the invention is attained in the manner as previously described with reference to the inventive method by employing a series of conveying, aligning and assorting mechanisms all of which are capable of carrying out their respective functions at a high speed by the provision of suitable control means which insure that each of these conveying mechanisms has a conveying output which is at least as high as the output of the fastener utilizing mechanism at the end of the machine. These control means are designed so as to insure that the conveying output of at least one conveying mechanism of the machine will be controlled by the conveying output of a subsequent conveying mechanism.

A further object of the invention as also previously indicated with reference to the inventive method is to provide a machine in which subsequent to a conveying mechanism which has an excessive conveying output, the excessive fasteners instead of causing a jamming of the further conveying movement will be returned to a position preceding this conveying mechanism.

These and additional objects, features and advantages of the present invention will become further apparent from the following detailed description thereof which is to be read with reference to the accompanying drawings, in which;

Referring to the drawings, the machine according to the invention comprises the following main components: a shaking container mechanism A; a steep-angle conveyer B; an aligning mechanism C which divides the single nail current supplied by the steep-angle conveyer B into two branch currents which are aligned in longitudinal guide rails; a nail brake $D_1$ for each of these branch currents; a sorting mechanism E; a nail brake $D_2$; and a mechanism F in which the nails which are supplied in each row are connected to each other to form a nail strip.

For a better understanding of the invention, each of the main components of the machine as mentioned above will hereafter be separately described in detail:

The Shaking Container Mechanism A (or hopper)

Figure 1:
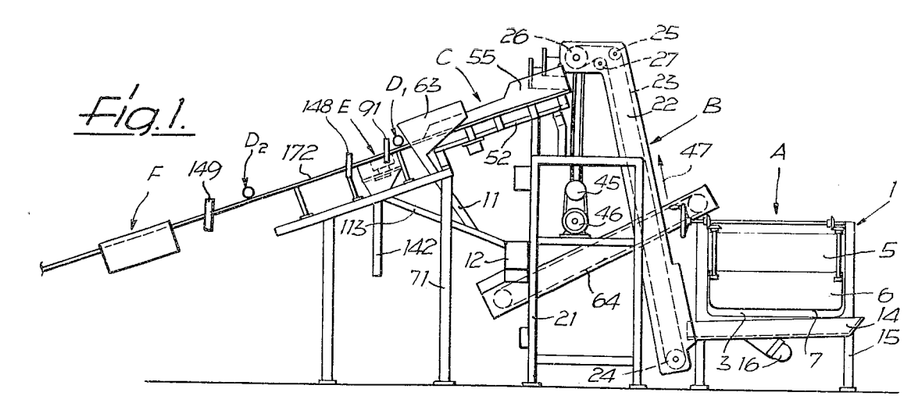
FIGS. 1 and 2 respectively are a diagrammatic side view and a diagrammatic top view of a machine according to one embodiment of the invention.
Figure 3:
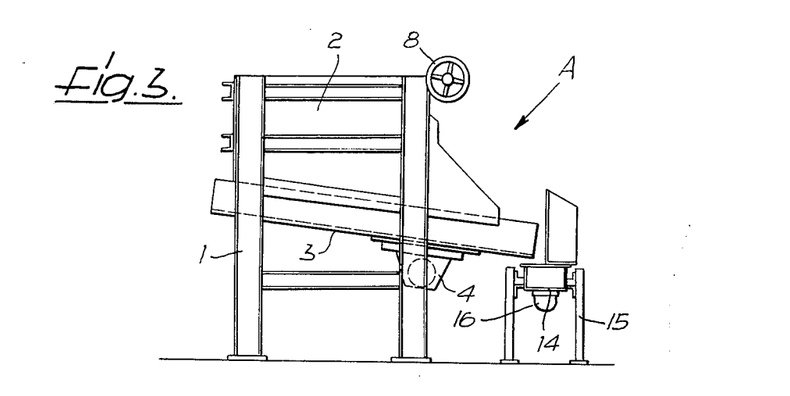
FIG. 3 is an end view of the shaking container and the associated conveying trough which form the first elements of the machine which are located at the right side in FIGS. 1 and 2, but are seen from the left side of these elements in FIG. 1.
Figure 4:
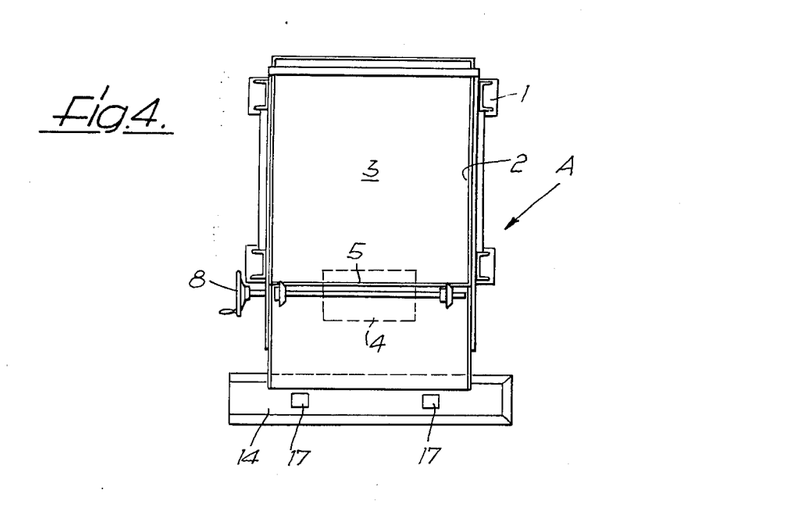
FIG. 4 is a top view of the elements as shown in FIG. 3.
Figure 5:
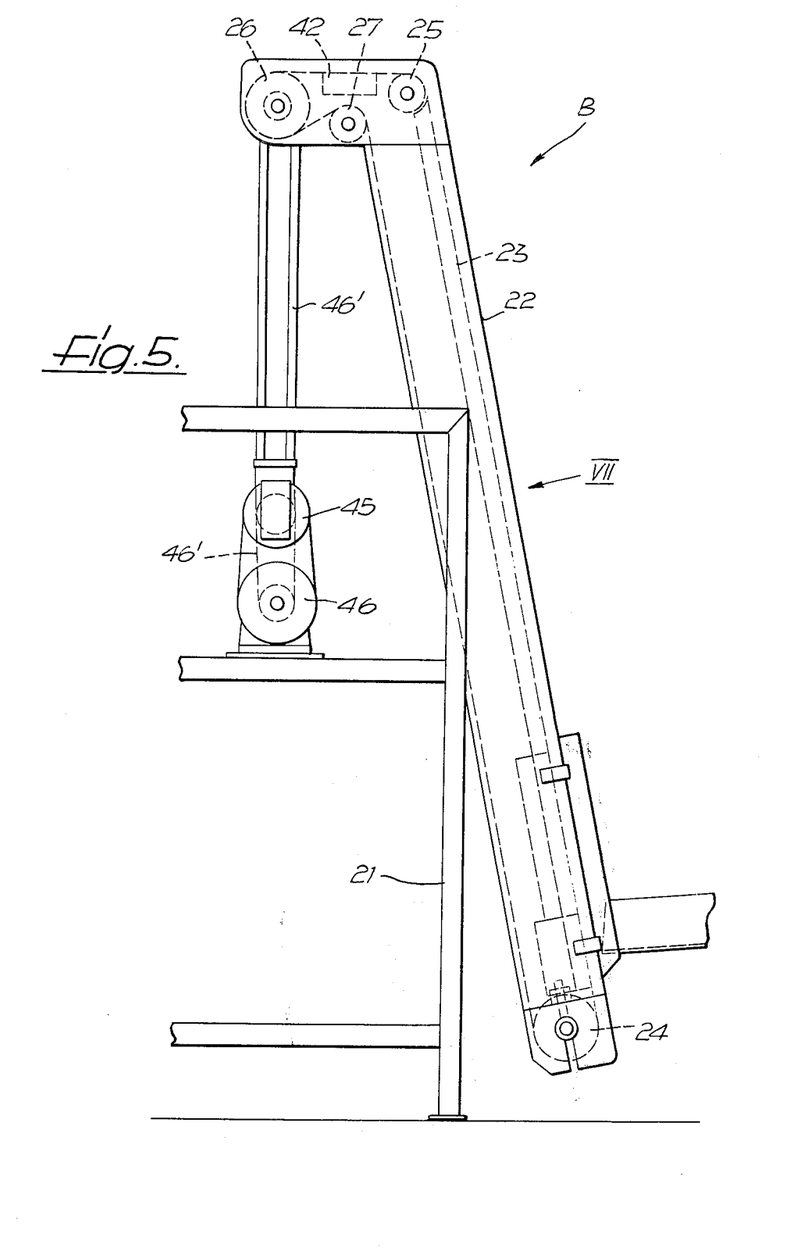
FIG. 5 is an enlarged view of a part of FIG. 1 and shows the magnetic steep-angle conveyer at the left end of the mentioned conveying trough.

As illustrated particularly in FIGS. 1, 3 and 4, this mechanism A comprises a frame 1 to which the four side walls of a container 2 are secured. Underneath these side walls, the container is provided with a separate inclined bottom 3 which is resiliently mounted by suitable means, not shown, and to which a vibrator 4 is secured. Side wall 5 toward which the container bottom 3 is downwardly inclined is provided with a relatively wide slot 7 above the bottom 3. The effective size of this slot 7 is adjustable by means of a slide member 6 which is mounted on the outer side of side wall 5 and may be shifted by the operation of a hand wheel 8.

As may be seen in the top view of the container as shown in FIG. 4, the container bottom 3 extends for a certain distance beyond the side wall 5 so that underneath the projecting front end of the container bottom and independently of the frame 1 a conveying trough 14 may be provided. By resilient means, not shown, the conveying trough 14 is movably mounted on the inner side of a frame 15, and by means of a vibrator 16 this conveying trough may be vibrated so that the nails which are fed into it from the container 2 will be moved in the direction toward the steep-angle conveyer B.

Above the bottom of the conveying trough 14 the feeler heads 17 of several proximity switches are provided. These feeler heads 17 may be adjusted so as to be spaced at any desired distance from the bottom of the trough and they are designed in the usual manner so as to actuate the proximity switches when ferromagnetic parts such as nails move to points which are spaced at a certain distance from these heads. The proximity switches are connected into the supply circuit of the vibrator 4 so that when energized they will interrupt the current supply of this vibrator and thus stop the latter.

Before the operation of the shaking container mechanism A is started, the container 2 is filled with nails which are simply dumped into the same without regard of their positions relative to each other. The vibrators 4 and 16 which are then started cause the nails to slide along the inclined container bottom 3 and through the outlet slot 7 and then over the projecting end of the container bottom into the conveying trough 14 from which, due to the vibrations of the latter by the vibrator 16, the nails will slide along this trough toward the left, as seen in FIG. 1, and form a layer of nails on the bottom of the trough 14. When this layer of nails has been built up to a certain height at which the nails are sufficiently close to the feeler heads 17, these feeler heads will respond and actuate the proximity switches which will then switch off the vibrator 4 so that a further supply of nails from the container 2 will be stopped until the thickness of the layer of nails on the bottom of trough 14 has decreased to such an extent that the feeler heads 17 will again switch the proximity switches to their normal position in which the vibrator 4 will again be started. The conveying trough 14 will thus be filled uniformly at all times. Due to the continuous shaking movement of this trough, the nails will during this forward travel be distributed over the entire width of the trough and thus form a uniform nail current. The feeler heads 17 therefore form a control mechanism which regulates the output of nails from the container 2 and also the feeding capacity of the conveying trough 14.

The Steep-Angle Conveyer B

As illustrated particularly in FIGS. 5 to 11, this conveyer B comprises a frame 21 to which the frame 22 for supporting a conveyer belt 23 is secured which has a width of approximately 300 mm. On this frame 22, a lower guide roller 24 and three upper guide rollers 25, 26 and 27 are rotatably mounted on which the conveyer belt 23 is supported. The strand of the conveyer belt 23 which extends from the lower guide roller 24 at a steep angle upwardly to the first upper guide roller 25 and from the latter substantially horizontally to the second upper guide roller 26 forms the nail-conveying strand of the steep-angle conveyer B.

The nails which are fed by the conveying trough 14 to the lower end of the conveying strand of the conveyer belt 23 will be attached to this strand so as to be carried upwardly by the latter by providing underneath the conveying strand of belt 23, which consists of a non-magnetizable material, a series of magnet poles which are arranged as illustrated particularly in FIGS. 7, 9, 10 and 11.

Within the lower part of the conveying strand, the magnet poles consist of three iron rails 28 which extend parallel to the longitudinal axis of this strand and are laterally spaced from each other. The gaps between the inner and outer iron rails 28 and the frame 22 are filled out by four aluminum rails 29. The adjacent iron rails 28 are connected to each other by shell-shaped permanent magnets 31. The iron rails 28 together with the aluminum rails 29 thus form a system of magnet poles of a uniform magnetic strength which hereafter will be simply called a magnetic rail. This magnetic rail for the lowest part of the conveying strand of belt 23 only extends upwardly beyond the end of the conveying trough 14 to a level which is spaced at a distance of about 150 mm from this end. Above the upper end of the lower magnetic rail and at a distance of about 450 mm therefrom which forms a gap 32, an upper magnetic rail is mounted which is of the same construction as the lower magnetic rail and has a length of about 2000 mm and extends from the upper end of the gap 32 up to the upper guide roller 25.

Figure 7:
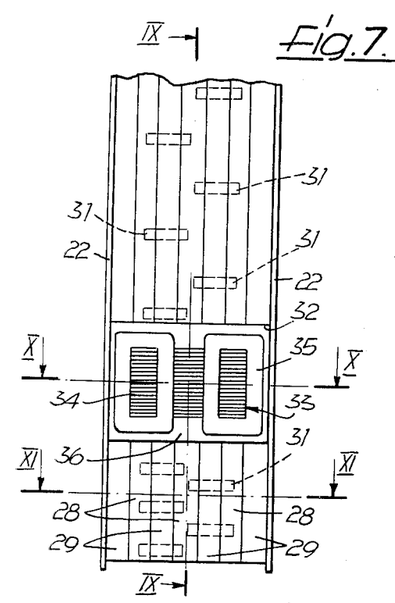
FIG. 7 is a view of a broken-away part of the magnetic steep-angle conveyer, as seen in the direction of the arrow VII in FIG. 5, but without a conveyer belt so as to illustrate the arrangement of the magnet poles.

Within this gap 32 an adjustable electromagnet 33 is mounted which is adapted to produce a magnetic field of a variable field intensity for regulating the thickness of the layer of nails which are to be further conveyed.

Figure 10:
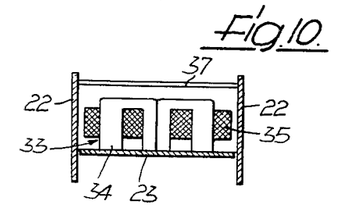
Figure 11:
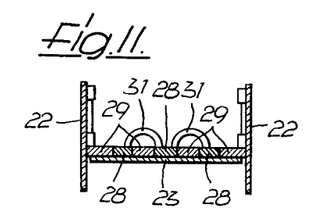

The laminated core 34 of this magnet forms poles which, as shown in FIGS. 7 and 10, are open toward the conveying strand of belt 23. With the exception of the polar surfaces, the core 34 and the windings 35 are embedded in a casting resin 36 within a container 37 which is open toward the conveying strand and secured to the frame 22. The magnetic central part of the magnetic rail and of the electromagnet 33 has a width of about 150 mm.

Figure 8:
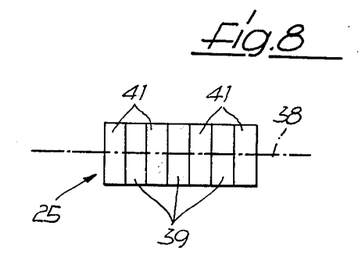
FIG. 8 is a detail view of the first upper guide roller for the conveyer belt of the steep-angle conveyer as shown in FIG. 1.
Figure 9:
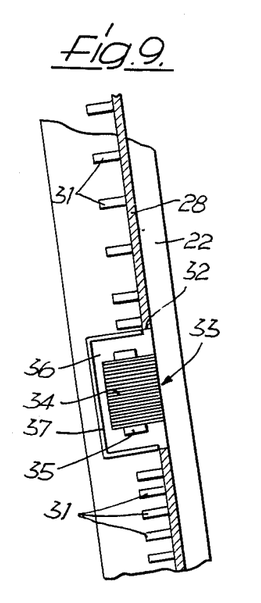
FIGS. 9, 10 and 11 are cross sections which are taken along the lines IX — IX, X — X, and XI — XI, respectively, in FIG. 7.

For holding the layer of nails of the thickness as controlled by the electromagnet 33 also locked to the conveying strand of belt 23 within an area around the upper guide roller 25, the latter consists of a plurality of disks 39 and 41 of alternately different materials, as shown in FIG. 8, which extend vertically to the axis 38 of the guide roller. Disks 39 which are spaced from each other and from the frame 22 by the spacing disks 41 are magnetized and thus form magnet poles, while the spacing disks 41 consist of a nonmagnetizable material, for example, of aluminum.

Underneath the horizontal section of the conveying strand of belt 23 between the upper guide rollers 25 and 26 a demagnetizing magnet 42 is mounted.

For driving the conveyer belt 23, a motor 45 is provided which drives the second upper guide roller 26 by means of a reduction gear 46 and a chain 46'.

During the operation of the machine, the conveyer belt 23 travels in the direction of the arrow 47, as shown in FIG. 1. The nails which are supplied by the conveying trough 14 and lie substantially horizontally on the bottom of the latter are attached by the lower magnetic rail 28, 29 toward and upon the conveyer belt 23. By thus being magnetized, the nails will then form a nail layer on the conveyer belt which is conveyed upwardly by the conveying strand of the belt. When the nails on belt 23 pass over the area in which the electromagnet 33 is mounted, a layer of nails will remain on the belt which has a thickness depending upon the intensity to which the magnetic field of this magnet has been adjusted, while the additional nails will drop off and fall back into the conveying trough 14. By adjusting the field intensity of magnet 33 it is therefore possible to control exactly the quantity of nails which will be taken along by the conveyer belt 23. When the nails reach the horizontal section of the conveying strand of belt 23 between the two guide rollers 25 and 26, they will be demagnetized by the demagnetizing magnet 42 so that after passing over the guide roller 26 the nails will drop off the conveyer belt 23 and into the aligning mechanism C.

The Aligning Mechanism C

This aligning mechanism C which is illustrated particularly in FIGS. 6 and 12 to 14 comprises a trough-shaped distributor 65 which is mounted in front of and below the guide roller 26 of the conveyer B. The bottom of this distributor 65 is shaped like a roof and forms two gliding surfaces 65a and 65b which are downwardly inclined toward the right and left from the center of the plane of travel of the conveyer belt 23. Each of these gliding surfaces 65a and 65b terminates into a conveying trough 66 which is downwardly inclined from the distributor 65 and extends within a plane at a right angle to the plane of travel of the conveyer belt 23. The lower end of each of these conveying troughs 66 terminates into the upper end of an aligning trough 51 which extends parallel to the plane of travel of the conveyer belt 23 and is downwardly inclined from its upper end.

Figure 6:
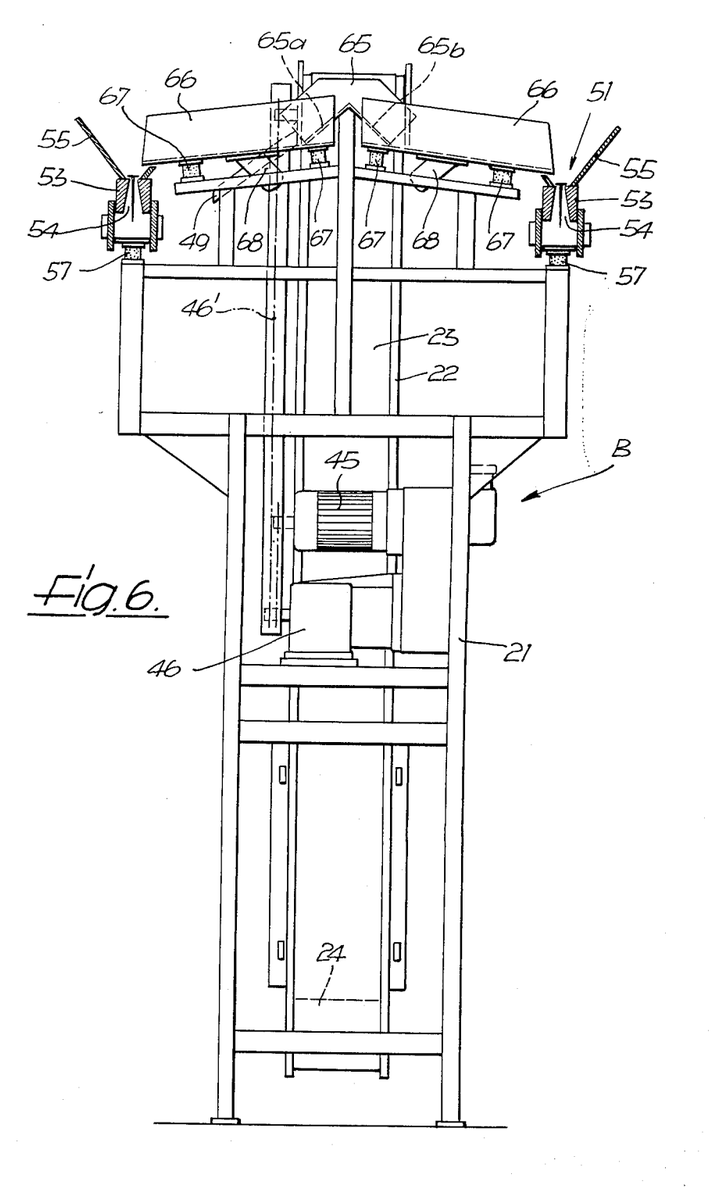
FIG. 6 is a view of the magnetic steep-angle conveyer as seen from the left side of FIG. 5.

As shown particularly in FIG. 6, the distributor 65 is rigidly mounted on the frame 21 which also carries the conveyer B, while the conveying trough 66 and the upper ends of the aligning troughs 51 are resiliently mounted on frame 21 by means of cushion elements 67 and 57, respectively. Each conveying trough 66 carries a vibrator 68 and is vibrated thereby for properly conveying the nails to the aligning troughs 51. The lower end of each aligning trough 51 is likewise resiliently mounted by cushion elements 58 on a frame 71 which also supports the associated sorting mechanism E. Each of the two aligning troughs 51 comprises a frame 52 the upper part of which carries two parallel guide rails 53 which are spaced from each other by a guide slot 54 which has a width substantially equal to the diameter of the nail shanks. Each pair of rails 53 further carries guide plates 55 which extend parallel to these rails and are inclined toward the guide slot 54 and together form a trough which tapers downwardly to the guide slot 54.

Each of the two frames 52 of the two aligning troughs 51 carries a pair of vibrators 59 which set the respective aligning trough into vibrations which extend in a direction differing at an angle of 30° from the longitudinal direction of the rails 53 so as to attain the highest possible conveying speed of the nails.

Figures 12, 14:
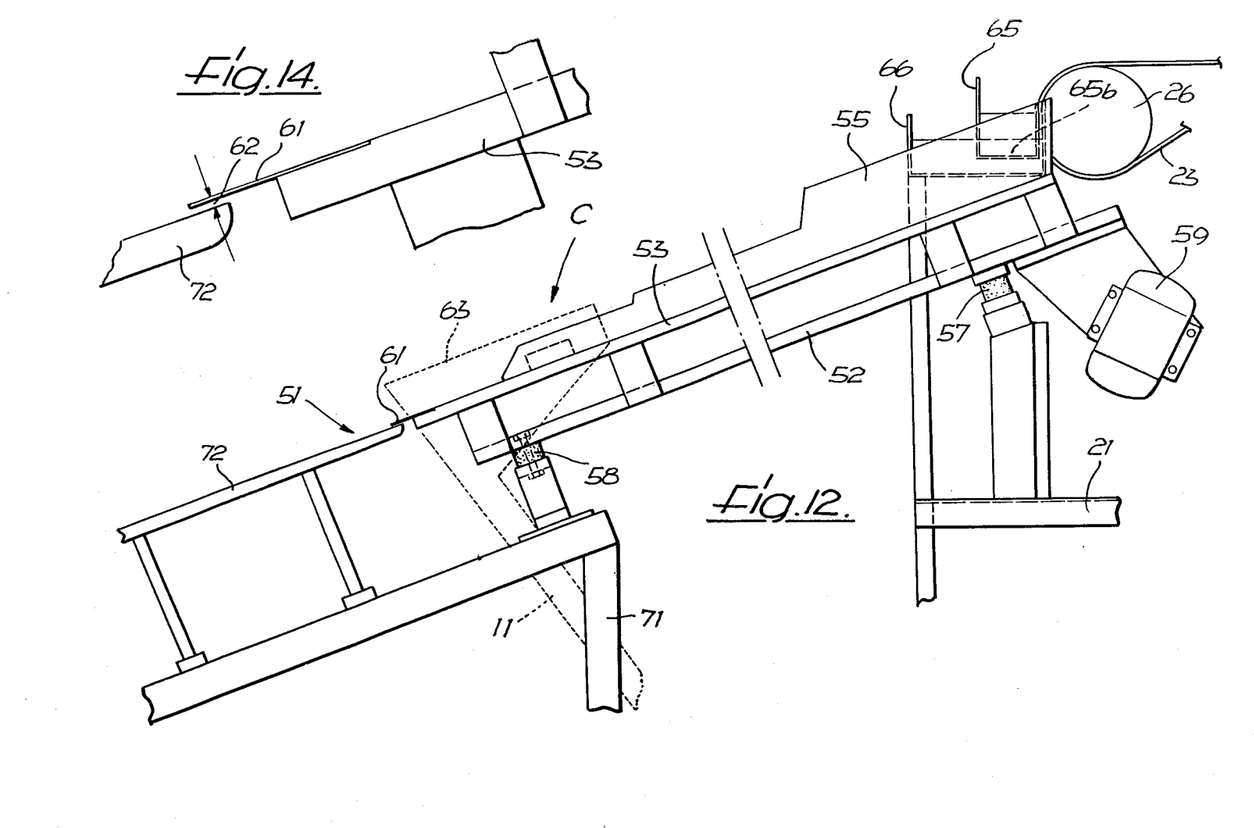
FIGS. 12 and 13 respectively are enlarged side and top views of the aligning troughs of the machine as shown in FIGS. 1 and 2, respectively.
FIG. 14 is an enlarged side view of the adjacent ends of two successive guide rails.
Figure 13:
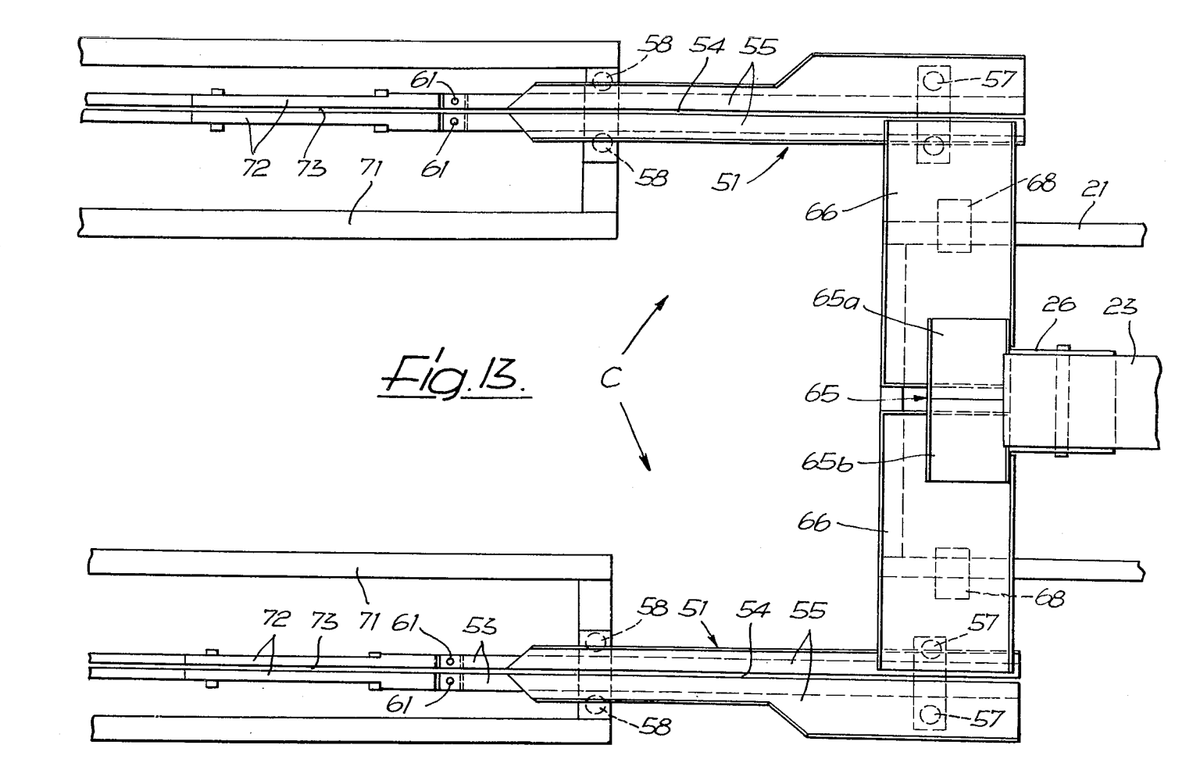

In order to be able to continue the guide slot 54 of the vibrating aligning troughs 51 by a guide slot 73 in a guide rail 72, which is rigidly secured to the frame 71, without reducing the ability of the guide rails 53 to oscillate, the associated guide rails 72 and 53 are completely separated from each other as illustrated particularly in FIG. 14. Each guide rail 53 is provided with an extension 61 which projects beyond the actual end of the rail and over the upper side of the adjacent end of the associated stationary rail 72 from which it is spaced at a distance 62. This has not only the advantage that the vibrating rails 53 are mechanically separated from the stationary rails 72, but also that a step is formed between the adjacent guide slots 53 and 73 whereby the adjacent nails 89 will be temporarily separated from each other and the head of one nail will drop over and overlap the head of the nail which preceded it in the course of travel.

Guide plates 55 begin at the upper ends of guide rails 53 which face the steep-angle conveyer B, and these first parts of guide plates 55 are made higher and thus of a greater width so as to form a wide collecting funnel, while the subsequent parts of these guide plates may be of a smaller width. Guide plates 55 terminate at their lower ends at a certain distance from the upper ends of guide rails 53 so that any excessive nails which have been supplied by the steep-angle conveyer B into the aligning troughs 51 and did not find any room in the guide slots 54 may drop off the vibrating guide rails 53.

Figure 2:
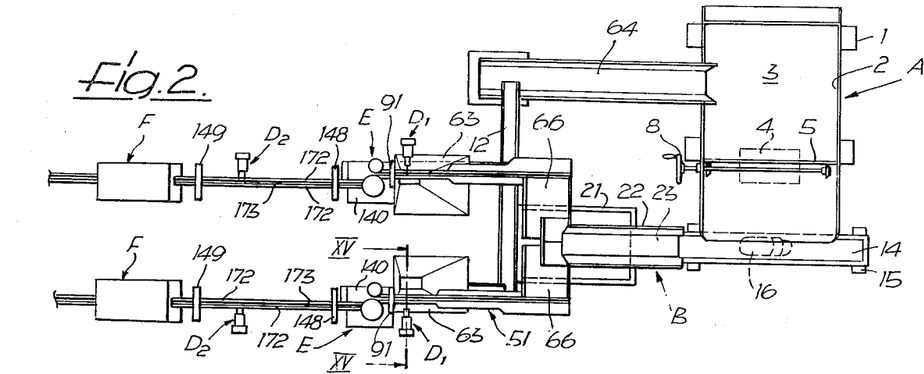

In order to catch these excessive nails which drop off the lower ends of each pair of guide rails 53, a collecting funnel 63 is provided underneath these ends which, as shown in FIGS. 1 and 2, is connected by a pipe line 11 and a returning trough 12 to a conveyer belt 64 which then returns these nails to the container 2.

The rails 53 are preferably adjustably connected to the frame 52 so as to permit the distance between them and thus the width of guide slot 54 to be adjusted in accordance with different diameters of the shanks of nails which were filled at different times into the container 2.

During the operation of the machine, the aligning troughs 51 are vibrated by the vibrators 59. The nails dropping from the steep-angle conveyer B into the aligning troughs 51 then slide along the guide plates 55, and their shanks then slide into the guide slots 54, while their heads are suspended on the guide rails 53. Due to the inclination of the aligning troughs and due to the vibration of the latter, the nails will then slide along these troughs within the guide slots 54 until they pass to the following guide slots 73. In order to utilize the aligning troughs 51 as fully as possible, the conveying capacity of the steep-angle conveyer B is adjusted so as to be slightly larger than the receiving capacity of the aligning troughs 51. This has the consequence that more nails might be supplied to the aligning troughs than can find room in the guide slots 54. The excessive nails will then slide downwardly along the aligning troughs between the guide plates 55 until at the end of the guide plates 55 they will drop off the guide rails 53 and fall into the collecting funnel 63 and then pass to the conveyer belt 64 which return them to the container 2.

The Nail Brakes $D_1$ and $D_2$

The nail brakes $D_1$ and $D_2$ may be employed in connection with a guide slot for nails formed between guide rails whenever provisions are made in the preceding apparatus to insure that no interferences will occur in the operation of the machine which may be due to an excessive supply of nails. This is attained, for example, in the aligning unit C in which any excessive nails will be returned through the collecting funnel 63 and the return lines 11 and 12 and by the conveyer belt 64 to the container 2. It is the purpose of the nail brake D to avoid interferences in the operation of the machine which might be caused by a subsequent sensitive mechanism when the pressure which might be caused by nails which are dammed up against each other in the guide rail exceeds a certain value.

In the present case, it is the object of the nail brakes $D_1$ and $D_2$ to prevent the occurrence of interferences in the operation of the following mechanisms, that is, in the sorting mechanism E or in the mechanism F, which may be caused by an excessive accumulation of nails at points preceding these mechanisms.

The nail brakes have the advantage that, if the speed of rotation of the brake wheel 86 as subsequently described is properly adjusted, a small braking force will be exerted upon the gliding speed of the individual nails, whereby two successive nails will at first be separated from each other and the head of the second nail will then overlap and engage upon the head of the preceding first nail. This is important especially as regards the nail brake $D_2$ since the proper operation of the mechanism F requires the proper overlapping of the heads of the successive nails.

Figure 15:
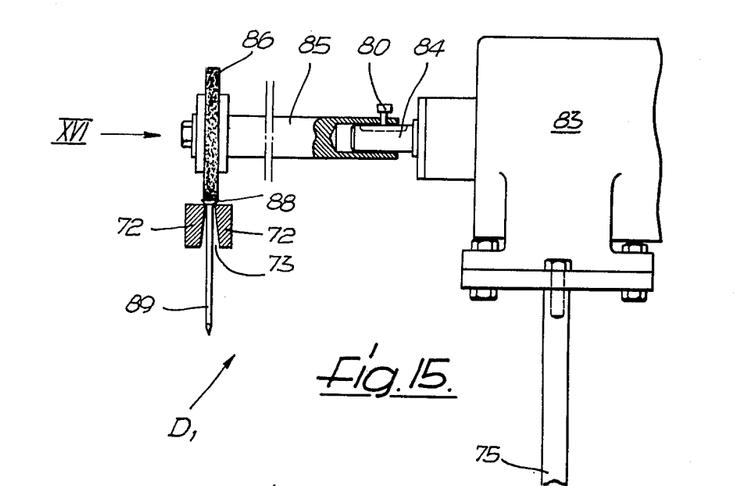
FIG. 15 is an end view of a nail brake, which is partly shown in cross section taken along the line XV - XV in FIG. 2.
Figure 16:
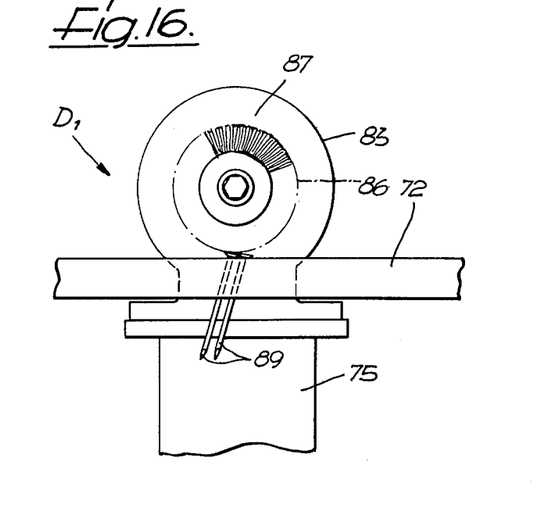
FIG. 16 is a side view of the first nail brake, as seen in the direction of the arrow XVI in FIG. 15.

FIGS. 15 and 16 illustrate the nail brake $D_1$ in detail. Frame 71 carries an arm 75 which is adjustable to different heights and the upper end of which carries an electric motor 83 the speed of which is variable. The axis of the shaft 84 of this motor 83 extends transverse to the direction of the rails 72 and within a plane parallel to and above the plane of these rails. Over the outer end of this shaft 84 a shaft 85 is plugged which may be secured in different axial positions to the motor shaft 84 by means of a screw 80. The free end of this shaft 85 carries a brake wheel 86 which forms a rotary brush which is composed of perlon bristles. Since the arm 75 is adjustable to different heights and the shaft 85 may be adjusted in its axial direction the brake wheel 86 may be adjusted so as to be located directly above the guide slot 73 and at such a distance from the guide rails 72 that the heads 88 of the nails 89, the shanks of which are located in the guide slot 73, will be clamped between the brake wheel 86 and the rails 72.

Between the brake wheel 86 and the subsequent mechanism and at the distance from the latter which determines the highest permissible accumulation of nails, a light barrier 91, as indicated in FIG. 1, is provided the light beam of which is adapted to pass through the guide slot 73 and which is interrupted when the nails are piled up against each other from the following sorting mechanism E back to and beyond the light barrier 91. This light barrier is electrically connected to the brake motor 83 so as to switch off this motor when the light barrier indicates that the nails are piled up against each other.

During the operation of the machine, the motor 83 rotates in such a direction that the part of the peripheral surface of the brake wheel 86 facing the rails 72 moves in the direction in which the nails 89 are being conveyed. In the normal operation, the nails underneath the brake wheel 86 will then be pushed forwardly due to the rotation of this wheel. The peripheral speed of brake wheel 86 is preferably adjusted so as to be in accordance with the normal gliding speed of the nails. However, as soon as the light barrier 91 indicates that the nails are piled up in the guide slot 73 in front of the next following mechanism, the motor 83 will be switched off so that the brake wheel 86 will be stopped. This has the result that the following nails will be arrested by the brake wheel 86 so that the accumulation of nails which has been formed in front of the next mechanism will not be increased. If the guide slot of the respective aligning trough 51 is filled up at the nail brake $D_1$, the further nails supplied by the steep-angle conveyer B will without causing any interference be returned to the shaking container 2 through the collecting funnel 63 and the return lines 11 and 12 and by the conveyer belt 64. The nail brake $D_2$ is designed similar to the nail brake $D_1$ and its operation is controlled by a light barrier 149.

The Sorting Mechanism E

The sorting mechanism E as illustrated only diagrammatically in FIGS. 1 and 2 and further details of which are disclosed in the French patent No. 2,051,062 and in U.S. Pat. No. 3,709,328 is mounted on the frame 71 and its inlet is formed by the guide slot 73 which is defined by the guide rails 72. As shown in FIGS. 1 and 2 and more clearly in FIG. 17, this mechanism E has two outlets, that is, a first outlet which is formed by the guide slot 173 between a pair of guide rails 172 and a second outlet which is formed by a funnel 140 which terminates into a discharge pipe 142 through which nails which are crooked or useless for other reasons will be passed to a container not shown.

In order to permit the sorting mechanism E also to be employed as a nail returning device in the event that an excessive number of nails piles up in the guide slot 173 forming the first outlet, the funnel 140 forming the second outlet is connected by a return pipe 113 to the returning trough 12 as previously mentioned from which the excessive nails are then dropped upon the conveyer belt 64 which returns them into the container 2. The funnel 140 is connected to the discharge pipe 142 and to the return pipe 113 by a connecting element 144 in which a flap 146 is provided which by means of a pneumatic jack 147 may be pivoted about an axis 145 to an ejecting position, as indicated in dotted lines in FIG. 17, and to a returning position, as indicated in dot-and-dash lines. In the first of these positions, flap 146 closes the passage to the return pipe 113 and opens the passage to the discharge pipe 142, while in its other position flap 146 closes the passage to the discharge pipe and opens the passage to the return pipe. For controlling the operation of the pneumatic jack 147 and for at the same time controlling a switch mechanism, not shown, for altering the functions of the sorting mechanism E, a light barrier 148 is provided the light beam of which is adapted to pass through the guide slot 173.

Figure 17:
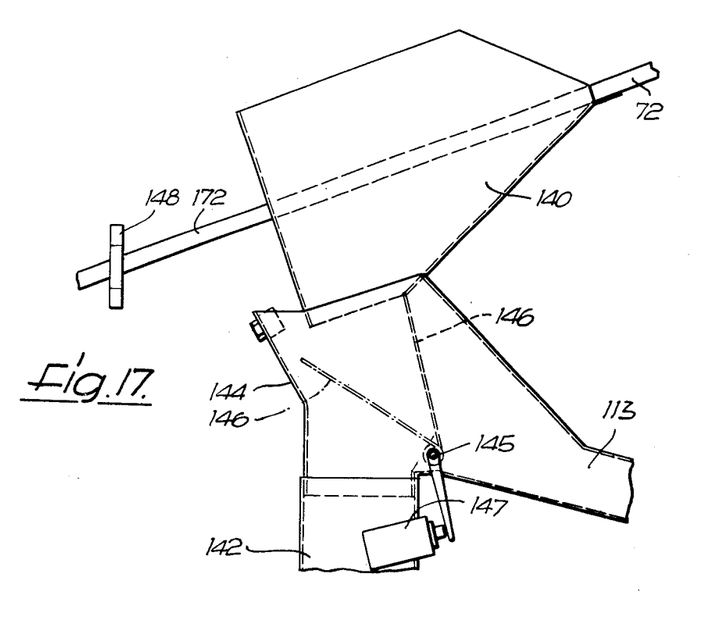
FIG. 17 is a diagrammatic side view of the collecting funnel of the second outlet of the sorting apparatus as shown in FIG. 1.

If this light barrier 148 is not interrupted by a nail within the guide slot 173, flap 146 will be in its ejecting position in which a useless nail, for example, a crooked nail, which has been sorted out by the sorting mechanism will be discharged through pipe 142. If, however, the nails 89 pile up in the area between the brake wheel $D_2$ and back beyond the light barrier 148, the pneumatic jack 147 will pivot the flap 146 to its returning position and at the same time and as long as the light trap 148 indicates that the nails are still piled up, the sorting mechanism will be actuated so as to eject all newly arriving nails into the funnel 140 from which they are then returned by the returning trough 12 and the conveyer belt 64 to the container 2. Thus, if an excessive accumulation of nails 89 occurs in front of the brake wheel $D_2$ due to clogging at the nail connecting mechanism F, this cannot possibly cause the sorting mechanism E to be clogged. As soon as the nail current again starts to flow and an accumulation of nails ceases at the light barrier 148 the latter will therefore no longer be continuously interrupted, flap 146 will be pivoted to its ejecting position so that the sorting mechanism E will again function normally.

The sorting mechanism E therefore forms a switch which is adapted to be shifted by the light barrier 148 from a guiding position in which the nails are further conveyed through the first outlet of the sorting mechanism to a returning position in which the nails will be returned by the return line 113 and 12 and the conveyer belt 64 to the container 2.

The second light barrier 149 similarly controls the operation of the brake wheel $D_2$ so that whenever nails are piled up in front of the mechanism F up to the light barrier 149, the brake wheel $D_2$ will slow down the further supply of nails.

Summary

During the operation of the machine, its main components as described above in detail are operatively associated with each other as follows: At first, a uniform layer of substantially horizontally disposed nails the thickness of which may be adjusted by the slide member 6 and the feeler heads 17 will be supplied from the shaking container mechanism A to the lower end of the conveying strand of the conveyer belt 23 of the steep-angle conveyer B. The nails lying substantially horizontally on the conveying strand and transverse to its direction of travel then move over the electromagnet 33, which regulates their quantity and eliminates an excessive amount from the conveyer belt, and they are then fed to the aligning mechanism C. The quantity of nails which is supplied from the shaking container mechanism A to the steep-angle conveyer B is therefore adjusted so as to larger than the quantity which this conveyer should actually convey. While the conveying strand of belt 23 passes this large quantity of nails over the electromagnet 33, the excessive number of nails will drop off and fall back into the conveying trough 14 which is prevented from being overloaded by the action of the feeler heads 14 of the proximity switches. The steep-angle conveyer B is thus controlled so that its conveying capacity will at all times be fully utilized.

The quantity of nails carried by the conveyer B is thus also controlled so that a larger number of nails will be delivered to the aligning mechanism C than can be aligned in the guide slots 54. This insures that the aligning mechanism will also be fully utilized at all times. The excessive nails which could not enter the guide slots 54 will then be returned by the collecting funnel 63, the return line 11 and 12 and the conveyer belt 64 to the shaking container 2.

The sorting mechanism E which is of a known construction is designed so as normally to be able to grade all of the nails which are supplied to it through the guide slot 73 and to sort out those which are useless. In the event, however, that before entering the sorting mechanism E the nails accumulate in guide slot 73 to such an extent that their pressure might impair the operation of the sorting mechanism, the nail brake $D_1$ will stop a further supply of nails. Thus, when guide slot 54 of the aligning mechanism C is filled with nails, the further nails which are supplied by the steep-angle conveyer B will pass into the collecting funnel 63 and be returned by the return line 11, 12 and the conveyer belt 64 to the shaking container 2.

If the nails pile up in front of the nail brake $D_2$ back to the light barrier 148, the latter will be interrupted and actuate the pneumatic jack 147 so as to pivot the flap 146 so that all nails which are further supplied to the sorting mechanism E will pass through the second outlet of the latter and be returned through the return line 113 and 12 and by the conveyer belt 64 to the shaking container 2. In both of the last-mentioned cases it is possible to eliminate the cause of an excessive accumulation of nails without requiring the operation of the machine to be interrupted and without any danger that an actual congestion of nails and stopping of their travel may occur anywhere. If the nails accumulate in front of the mechanism F back to the light barrier 149, brake wheel $D_2$ will hold back the nails which further arrive until the flow of nails is again normal.

Figure 18:
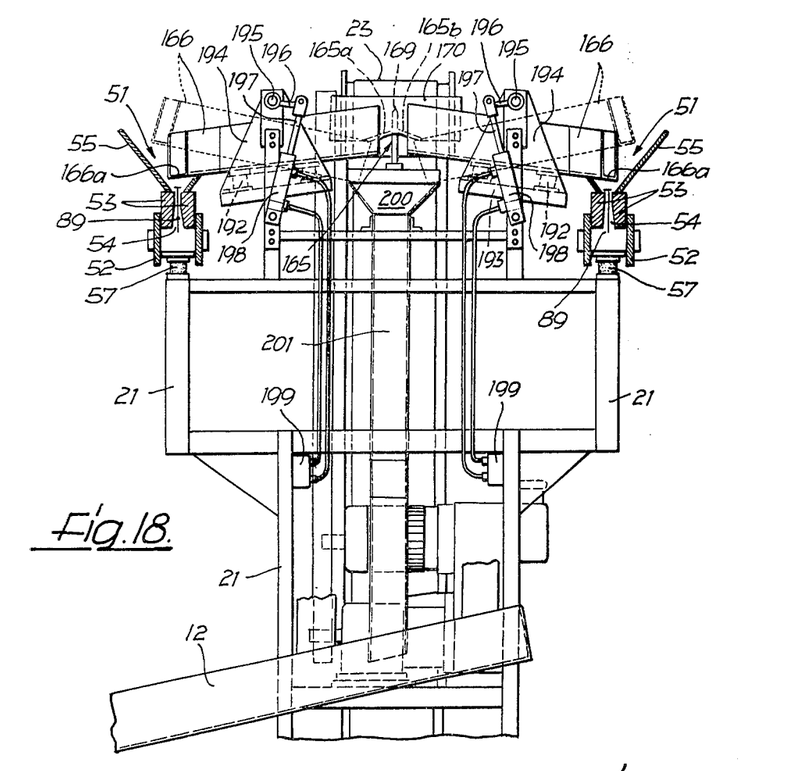
FIG. 18 is a view similar to FIG. 6 of a modification of the apparatus for dividing the single nail current into two branch currents; while FIGS. 19 and 20 respectively show a top view and a side view of the apparatus as shown in FIG. 18.
Figure 19:
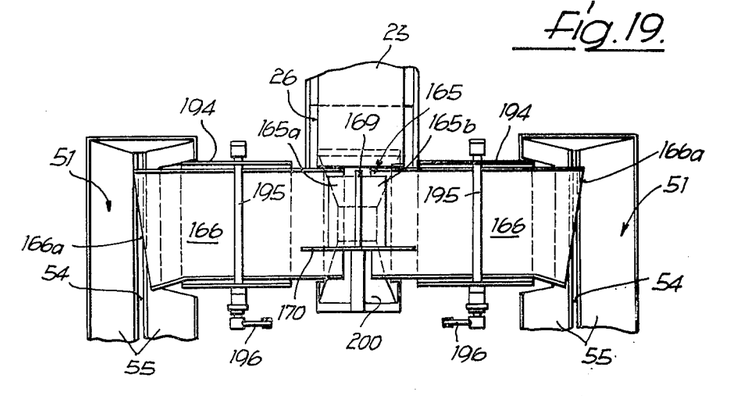
Figure 20:
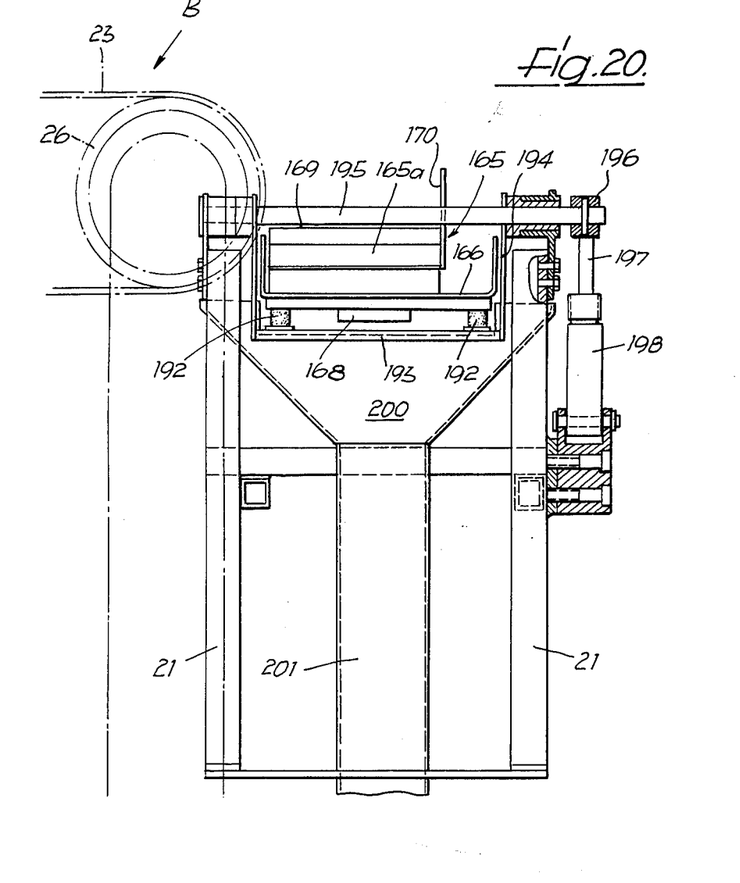

FIGS. 18 to 20 illustrate a modification of the means for dividing the nail current coming from the end of the horizontal section of the conveying strand of the steep-angle conveyer B into two branch currents which then continue to flow along the two aligning troughs 51. This current divider comprises a distributor 165 which is located underneath the guide roller 26 of the conveyer B and again comprises two gliding surfaces 165a and 165b which are inclined to each other like a roof. At the ridge of this roof, the two gliding surfaces merge into a vertical upwardly projecting partition 169 the upper edge of which forms the crest line of the two roof shaped gliding surfaces which extends in the direction of the central longitudinal plane of the conveyer belt 23 and thus parallel to the plane of travel of this belt. Thus, as seen from the central plane of travel of the conveyer belt 23, the two gliding surfaces 165a and 165b form guide surfaces for the nails which are downwardly inclined toward the right and left from the vertically projecting partition 169. The ends of the gliding surfaces 165a and 165b opposite to those facing the guide roller 26 are connected to a deflecting plate 170 which projects above these surfaces and is adapted to deflect any nails which might be thrown against it by the conveyer belt 23 toward the gliding surfaces 165a and 165b and also to split up any lumps of nails by their impact against this plate. The lower edges of the gliding surfaces 165a and 165b are disposed above the upper ends of the conveying troughs 166 which are downwardly inclined from the distributor 165 and extend substantially within a plane at a right angle to the plane of travel of the conveyer belt 23. Each of these conveying troughs 166 terminates from above into the upper end of one of the two aligning troughs 51.

Each of the two conveying troughs 166 has a U-shaped cross section and its bottom forms a plane gliding surface the end of which facing the distributor 165 as well as the outer edges of the two gliding surfaces 165a and 165b extend parallel to the plane of travel of the conveyer belt 23, while the edges of the other ends 166a of the bottoms of the two conveying troughs 166 facing the aligning troughs 51 are inclined and intersect the central vertical longitudinal planes of these aligning troughs at an acute angle, as shown in FIG. 19. The point of intersection between the edge of each of these ends 166a with the central vertical longitudinal plane of the associated aligning trough 51 is located at the center of the length of this edge. Each of these two conveying troughs 166 is resiliently mounted on four cushion elements 192 on the base plate 193 of a supporting frame 194 which is secured to a shaft 195. This shaft 195 is rotatably mounted on the frame 21 and carries on one end an arm 196 the other end of which is pivotably connected to the piston rod 197 of a pneumatic cylinder unit or jack 198 which, in turn, is pivotably mounted on the frame 21 and adapted to be controlled by a solenoid valve 199. The stroke of the piston rod 197 in each direction has such a length that, when the piston rod is in one end position as illustrated in FIG. 18 in full lines, the gliding surface which is formed by the bottom of the conveying trough 166 is downwardly inclined from the distributor 165 toward the aligning trough 51, while in the other end position as indicated in dotted lines in FIG. 18, the gliding surface of the respective conveying trough 166 is inclined in the opposite direction. In the space between the base plane 193 of each supporting frame 194 and the bottom of the associated conveying trough 166 a vibrator 168 is secured to the lower side of each conveying trough. Each of the two conveying troughs 166 together with the supporting frame 194 carrying the same thus forms a rocker which is pivotable back and forth from a conveying position, in which it guides the nails from the distributor 165 to the aligning troughs 51, to a nail returning position.

Underneath the edges of the two ends of the gliding surfaces of the conveying troughs 166 facing the distributor 165, a collecting funnel 200 is mounted which for returning the nails falling into this funnel 200 is connected to the container 2 by a pipe 201, the returning trough 12 and the conveyer belt 64.

This apparatus permits the sorting mechanism E to be employed solely for sorting out useless nails and not also for limiting the quantity of nails. The light barrier 91 which indicates an excessive accumulation of nails 89 in the guide slot 73 which continues the guide slot 54 between each pair of rails 53 does for this purpose not control the operation of a brake wheel $D_1$ as previously described, but it is connected to the solenoid valve 199 for controlling its operation in such a manner that, whenever the nails have accumulated back to the light barrier 91, the rocker which is formed by each conveying trough 166 will be pivoted from its conveying position to its returning position in which the nails coming from the distributor 165 will be returned through the conveying trough into the collecting funnel 200 and from the latter back to the container 2. Brake wheel $D_1$ may in this case be omitted or be mounted at another suitable position.

The light barrier 148 is therefore in this case only provided for switching off the sorting mechanism E so that if a row of nails has accumulated back to the light barrier 148, the sorting mechanism E will be switched off so that the nails will accumulate from a point in front of it back to the light barrier 91 and will thereby cause the rockerlike conveyer trough 166 to be pivoted back to its returning position.

During the operation of the machine, the nails coming from the conveyer belt 23 of the steep-angle conveyer B will be thrown against the deflecting plate 170 and then fall upon the gliding surfaces 165a and 165b of the distributor from which they fall into the conveying troughs 166 which normally are in their conveying position and are shaken by the vibrators 168. The nails will then slide along the gliding surfaces which are formed by the bottoms of these conveying troughs 166 and fall into the aligning troughs 51. Due to the inclined intersection of the delivery edges 166a of the gliding surfaces of the conveying troughs 166 with the central vertical plane of the guide slots 54 of the aligning troughs 51, the nails dropping into the aligning troughs will be uniformly distributed over the cross-sectional area of these troughs so that an accumulation of nails into lumps or clusters will be prevented. The shanks of the nails 89 will then slide in the aligning troughs 51 into the guide slots 54, while their heads will be suspended on the guide rails 53. As soon as a sufficient quantity of nails has accumulated in each guide slot 73, this will be indicated by the light barrier 91 which will then switch over the associated solenoid valve 199 so that the rockerlike conveying trough 166 will be pivoted from its conveying position to its returning position so that all further nails coming from the conveyer belt 23 of the steep-angle conveyer B will be returned through the collecting funnel 200, the pipe 201, the returning trough 11 and by the conveyer belt 64 into the container 2.

Each of the two rockerlike conveying troughs 166 thus forms a switch which is movable from a conveying position to a returning position and vice versa. In the conveying position, each conveying trough 166 connects the preceding guide means, that is, the distributor 165 to the guide means which are disposed immediately subsequent thereto and consist of the aligning trough 51. In the returning position of the conveying trough 166, however, the conveying movement in this direction will be interrupted.

In place of the light barrier 91, it is also possible to provide any other suitable indicating device which is adapted to indicate an accumulation of fasteners in the guide means at a position subsequent to the rockerlike switch.

Instead of pivotably mounting the conveying trough 166, it is also possible according to another embodiment of the invention which is not particularly illustrated to design another part of the nail guiding means to be movable, for example, so as to be slidable toward and away from the subsequent guide means. This movable guide part may, for example, also consist of a part of the rails between which the guide slot is provided.

The apparatus as illustrated in FIGS. 18 to 20 has the advantage over that according to the first embodiment of the invention that it provides a very simple returning mechanism in the form of a movable switch which may be shifted whenever required from its nail conveying to its nail returning position. As indicated in the preceding paragraph, such a switch may also be provided at any other suitable position in the course of the guide means since it only requires a part of these guide means to be movable relative to the others. The inventive principle of such movable switch means for returning the fasteners may therefore be applied in the form of a very simple structure at any desired point of the entire conveyer.

By providing the conveying troughs 166 according to FIGS. 18 to 20 in the form of pivotable rockers, there are no difficulties in mounting them so that their opposite ends will be in the proper positions relative to the distributor 165 and to the aligning troughs 51. It is only necessary to mount each of these troughs 166 so that in both positions to which it is pivotable its one end will be located underneath the distributor 165 and its other end above the aligning trough 51. Insofar as the functions of the rockerlike conveying troughs 166 are concerned, they may also be employed in association with nail collecting troughs different from the aligning troughs 51.

If in the machine according to FIGS. 1 to 17 the dividing mechanism as shown in FIG. 6 for dividing the nail current coming from the steep-angle conveyer B into two branch currents is replaced by the mechanism as shown in FIGS. 18 to 20, the machine will operate as follows: As soon as the nails have accumulated in front of the mechanism F back to the light barrier 149, the motor of the brake wheel D₂ will be switched off so that no further nails will be supplied to the light barrier 149 until the accumulated nails have sufficiently advanced so that the light barrier will again be free. If the nails accumulate from the brake wheel D₂ back to the light barrier 148 an interrupt the latter, it will switch off the sorting mechanism E, while the rockerlike troughs 166 will remain in their conveying position in order to insure that a sufficient quantity of nails will always be available in front of the sorting mechanism E. If the nails accumulate in front of the sorting mechanism E back to the light barrier 91, the rockerlike conveying trough 166 will be pivoted to its returning position and remain in this position until the light barrier 91 is again free of nails. The working capacity of the mechanism F will thus always be fully utilized and there is no danger that the operation of the mechanism F might be even temporarily interrupted because of an excessive accumulation of nails in the preceding part of the conveyer or because of an idling of any of the preceding conveying means.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A machine for conveying rod-shaped fasteners from a supply of unaligned fasteners into alignment in at least one row behind each other and to at least one fastener treating mechanism having a certain working output, comprising, in combination, (a) means for guiding said fasteners from said supply to said fastener treating mechanism; (b) a plurality of successive fastener conveying means operatively associated with said guide means and each having a conveying output at least equal to said working output of said fastener treating mechanism, one of said conveying means comprising a conveyor belt of a non-magnetizable material movable within a vertical plane, said belt having a conveying strand movable upwardly and further having a conveying side and a rear side, and lower and upper uniformly magnetized magnet poles mounted in fixed positions at said rear side and separated by a gap from each other, another one of said conveying means having an outlet for delivering fasteners to a lower part of the conveying side of said belt underneath said gap, first means for controlling the quantity of said fasteners adhering to and conveyed upwardly by said conveying strand, said first control means comprising an electromagnet mounted in said gap, and means for varying the field intensity of said electromagnet and for thus determining the thickness of the layer of fasteners conveyed by said conveying strand upwardly beyond said electromagnet; (c) means for indicating on said guide means at the inlet side of a further one of said conveying means the accumulation of a certain quantity of fasteners coming from a preceding one of said conveying means in excess of the actual conveying output of said further conveying means; (d) second means responsive to said indicating means for controlling the operation of said preceding conveying means; and (e) return means actuated by said second control means for returning at least some of said accumulated fasteners to a position of said guide means at the rear of said preceding conveying means.

2. A machine as defined in claim 1, in which the upper end of said conveying strand passes over a first guide roller deflecting said strand in a substantially horizontal direction to a second guide roller, said first guide roller comprising a plurality of magnetized discs and non-magnetizable discs spacing the adjacent magnetized discs from each other, and a demagnetizing magnet mounted intermediate said guide rollers for demagnetizing the fasteners on the substantially horizontal section of said conveying strand, said second guide roller projecting over the inlet of the next following one of said conveying means and adapted to drop said demagnetized fasteners into said inlet.

3. A machine for conveying rod-shaped fasteners from a supply of unaligned fasteners into alignment in at least one row behind each other and to at least one fastener treating mechanism having a certain working output, comprising, in combination, (a) means for guiding said fasteners from said supply to said fastener treating mechanism; (b) a plurality of successive fastener conveying means operatively associated with said guide means and each having a conveying output at least equal to said working output of said fastener treating mechanism, one of said conveying means comprising a distributor adapted to split up a current of fasteners conveyed thereto from a preceding one of said conveying means into at least two branch currents and at least two conveying troughs, said distributor having an inlet facing said preceding conveying means and at least two outlets facing said conveying troughs for delivering said branch current thereto; (c) means for indicating on said guide means at the inlet side of a further one of said conveying means the accumulation of a certain quantity of fasteners coming from a preceding one of said conveying means in excess of the actual conveying output of said further conveying means; (d) control means responsive to said indicating means for controlling the operation of said preceding conveying means; and (e) return means actuated by said control means for returning at least some of said accumulated fasteners to a position of said guide means at the rear of said preceding conveying means.

4. A machine as defined in claim 3, in which said distributor comprises two gliding surfaces inclined like a roof relative to each other and having a common ridge in straight alignment with the central vertical longitudinal plane of the outlet of the one of said conveying means immediately preceding said distributor, and a deflecting wall on said distributor and extending substantially transverse to said ridge at the end thereof remote from said outlet of said immediately preceding conveying means and projecting above said gliding surfaces, the lower edges of said gliding surfaces being disposed above said conveying troughs and forming said outlets of said distributor.

5. A machine for conveying rod-shaped fasteners from a supply of unaligned fasteners into alignment in at least one row behind each other and to at least one fastener treating mechanism having a certain working output, comprising, in combination, (a) means for guiding said fasteners from said supply to said fastener treating mechanism, said guide means comprising a conveying trough having a bottom forming a gliding surface; (b) a plurality of successive fastener conveying means operatively associated with said guide means and each having a conveying output at least equal to said working output of said fastener treating mechanism; (c) means for indicating on said guide means at the inlet side of a first one of said conveying means the accumulation of a certain quantity of fasteners coming from a preceding one of said conveying means in excess of the actual conveying output of said first conveying means; (d) control means responsive to said indicating means for controlling the operation of said preceding conveying means; (e) return means actuated by said control means for returning at least some of said accumulated fasteners to a position of said guide means at the rear of said preceding conveying means; (f) means responsive to the operation of said control means for deflecting at least some of said accumulated fasteners from said guide means to said return means, said deflecting means comprising a movable element interposed in said guide means and adapted to be moved from one position in which it connects the adjacent ends of said guide means to each other to another position in which it interrupts said guide means and leads to said return means, the movable element comprising a rocker pivotable about a horizontal axis extending transverse to the longitudinal axis of said trough; and (g) drive means for actuating said deflecting means, said control means comprising a control switch for actuating said drive means and, in turn, adapted to be actuated by said indicating means when said indicating means indicate said accumulation of said fasteners on said guide track at a position subsequent to said deflecting means.

6. A machine as defined in claim 5, further comprising a frame supporting said movable element, resilient connecting means interposed between said movable element and said frame and connecting them to each other, mens for mounting said frame so as to be pivotable about a horizontal axis and by said resilient connecting means also to pivot said movable element, and a vibrator directly secured to said movable element and being separate from said frame.

7. A machine as defined in claim 5, in which said guide means comprise a collecting trough disposed underneath the edge of one end of said movable element and leading toward a subsequent one of said conveying means.

8. A machine as defined in claim 7, in which the edge of said end of said movable element intersects at an acute angle the central vertical longitudinal plane of the collecting trough.

* * * * *